United States Patent Office 2,727,071
Patented Dec. 13, 1955

2,727,071

PROCESS FOR OBTAINING SUBSTITUTED CHLOROPROPANOLS FROM OXAZOLINES

Robert Michel Jacob, Ablon-sur-Seine, Paul Gailliot, Paris, and Jean Robert, Maisons Laffitte, France, assignors, by mesne assignments, to Parke, Davis & Company, Detroit, Mich., a corporation of Michigan No Drawing. Application February 23, 1951, Serial No. 212,484

Claims priority, application France June 16, 1950

7 Claims. (Cl. 260—562)

This invention relates to new substituted propanols and to a process for their preparation.

The new substituted propanols of the invention are the threo forms conforming to the conventional formula:

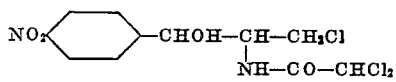

The term "threo" is used to distinguish from the structural isomer, the so-called "erythro" form, these structural forms differing as to the spatial relationship of the polar groups respectively attached to the two asymmetric carbon atoms. Both the erythro and the threo forms can exist as racemates of optically active isomers giving a total of six different forms. The foregoing structural formula of conventional type includes, therefore, the complete mixture of all six forms, the racemates of the erythro and threo series and the four individual isomers L-erythro, D-erythro, L-threo and D-threo. It should be noted that the configurational representation of the isomers as D and L bears no relation to the actual sign of the rotation but refers to the configuration about the alpha carbon atom. The D-threo compound has the same configuration with respect to the alpha carbon atom as the therapeutically active isomer of the diastereoisomeric amido-diol, 2-dichloracetamido-1-p-nitrophenylpropane 1:3-diol, known as "chloramphenicol" and which has been designated D(—)-threo 2-dichloracetamido-1-p-nitrophenylpropane 1:3-diol.

According to the present invention, the new compounds are prepared by the fission of the 2-dichloromethyl-4-p-nitrophenylhydroxymethyl-Δ²-oxazolines of the conventional formula:

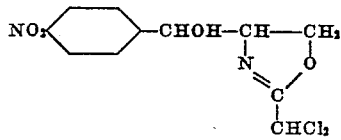

by treatment with hydrogen chloride under anhydrous conditions. The reaction is conveniently affected in an inert organic solvent medium such as dioxane at or about room temperature. The oxazolines employed as starting material may be prepared by the process described in the specification of co-pending applications Serial Nos. 199,936 and 199,939, now U. S. 2,686,787, both filed December 8, 1950, wherein a 1-para-nitrophenyl-2-aminopropane-1:3-diol is reacted with a dichloracetimino ether or thioether.

The compounds prepared by the process of the present invention, particularly the DL- and D-threo forms, constitute valuable intermediates for the preparation of chloramphenicol and the DL mixture of which it is the D- component.

The present invention is illustrated by the following non-limitative examples.

*Example I*

0.15 g. of DL-threo 2-dichloromethyl-4-p-nitrophenyl-hydroxymethyl-Δ²-oxazoline (M. P. 160–161° C.) are dissolved at room temperature in 3 cc. of anhydrous dioxane containing 14% by weight of dry hydrogen chloride. After standing for 30 minutes, 30 cc. of water are added. A product crystallises which is filtered off, washed with water and dried in vacuo in the presence of sulphuric acid. There are thus obtained 0.075 g. of DL-threo 2-dichloracetamido-1-p-nitrophenyl-3-chloropropane 1-ol of M. P. 135–136° C.

*Example II*

There is dissolved at room temperature 3 g. of L-threo 2-dichloromethyl-4-p-nitrophenylhydroxymethyl - Δ² - oxazoline, M. P. 141° C. and $(\alpha)_D^{23} = +173°$ (c=0.57% in ethyl acetate) in 30 c. c. of dioxane containing 13% by weight of dry hydrogen chloride, with external cooling to prevent the temperature exceeding 28° C. The solution is then allowed to stand for half-an-hour at room temperature, when the dioxane is driven off in vacuo in the cold. The residue is taken up in water; after seeding, a crystalline precipitate is obtained. It is filtered off, washed with water and then dried over sulphuric acid. There is thus obtained 2.1 g. of L-threo 2-dichloracetamido - 1 - p - nitrophenyl-3-chloropropane 1-ol; melting point 130–131° C., $(\alpha)_D^{23} = -21.8°$ (c=4.6% in ethyl acetate).

*Example III*

Following the procedure of Example II but starting from 3 g. of D-threo 2-dichloromethyl-4-p-nitrophenyl-hydroxymethyl-Δ²-oxazoline, M. P. 141–142° C., $(\alpha)_D^{25} = -178°$ (c=0.6% in ethyl acetate), there is obtained 1.5 g. of threo 2-dichloracetamido-1-p-nitrophenyl-3-chloropropane 1-ol, M. P. 130–131° C., $(\alpha)_D^{23} = +20.7°$ (c=4% in ethyl acetate).

We claim:

1. A process for the preparation of the threo forms of 2-dichloracetamido-1-p-nitrophenyl-3 - chloropropane 1-ol which comprises treating a threo form of 2-dichloromethyl-4-p-nitrophenylhydroxymethyl-Δ²-oxazoline with hydrogen chloride under anhydrous conditions at about room temperature.

2. A process for the preparation of the threo forms of 2-dichloracetamido-1-p-nitrophenyl-3 - chloropropane 1-ol which comprises treating a threo form of 2-dichloromethyl-4-p-nitrophenylhydroxymethyl-Δ²-oxazoline with hydrogen chloride under anhydrous conditions, at room temperature in an inert organic solvent.

3. A process for the preparation of the threo forms of 2-dichloracetamido-1-p-nitrophenyl-3-chloropropane 1-ol which comprises treating a threo form of 2-dichloromethyl-4-p-nitrophenylhydroxymethyl-Δ²-oxazoline with hydrogen chloride under anhydrous conditions, at room temperature in dioxane.

4. A process for the preparation of the DL-threo form of 2-dichloracetamido-1-p-nitrophenyl-3-chloropropane 1-ol which comprises treating the DL-threo form of 2-dichloromethyl-4-p-nitrophenylhydroxymethyl - Δ² - oxazoline with hydrogen chloride under anhydrous conditions, at room temperature in an inert organic solvent.

5. A process for the preparation of the DL-threo form of 2-dichloracetamido-1-p-nitrophenyl-3-chloropropane 1-ol which comprises treating the DL-threo form of 2-dichloromethyl-4-p-nitrophenylhydroxymethyl Δ² - oxazoline with hydrogen chloride under anhydrous conditions, at room temperature in dioxane.

6. A process for the preparation of the D-threo form of 2-dichloracetamido-1-p-nitrophenyl-3-chloropropane 1-ol which comprises treating the D-threo form of 2-dichloromethyl-4-p-nitrophenylhydroxymethyl - $\Delta^2$ - oxazoline with hydrogen chloride under anhydrous conditions, at room temperature in an inert organic solvent.

7. A process for the preparation of the D-threo form of 2-dichloracetamido-1-p-nitrophenyl-3-chloropropane 1-ol which comprises treating the D-threo form of 2-dichloromethyl-4-p-nitrophenylhydroxymethyl - $\Delta^2$ - oxazoline with hydrogen chloride under anhydrous conditions, at room temperature in dioxane.

No references cited.